UNITED STATES PATENT OFFICE.

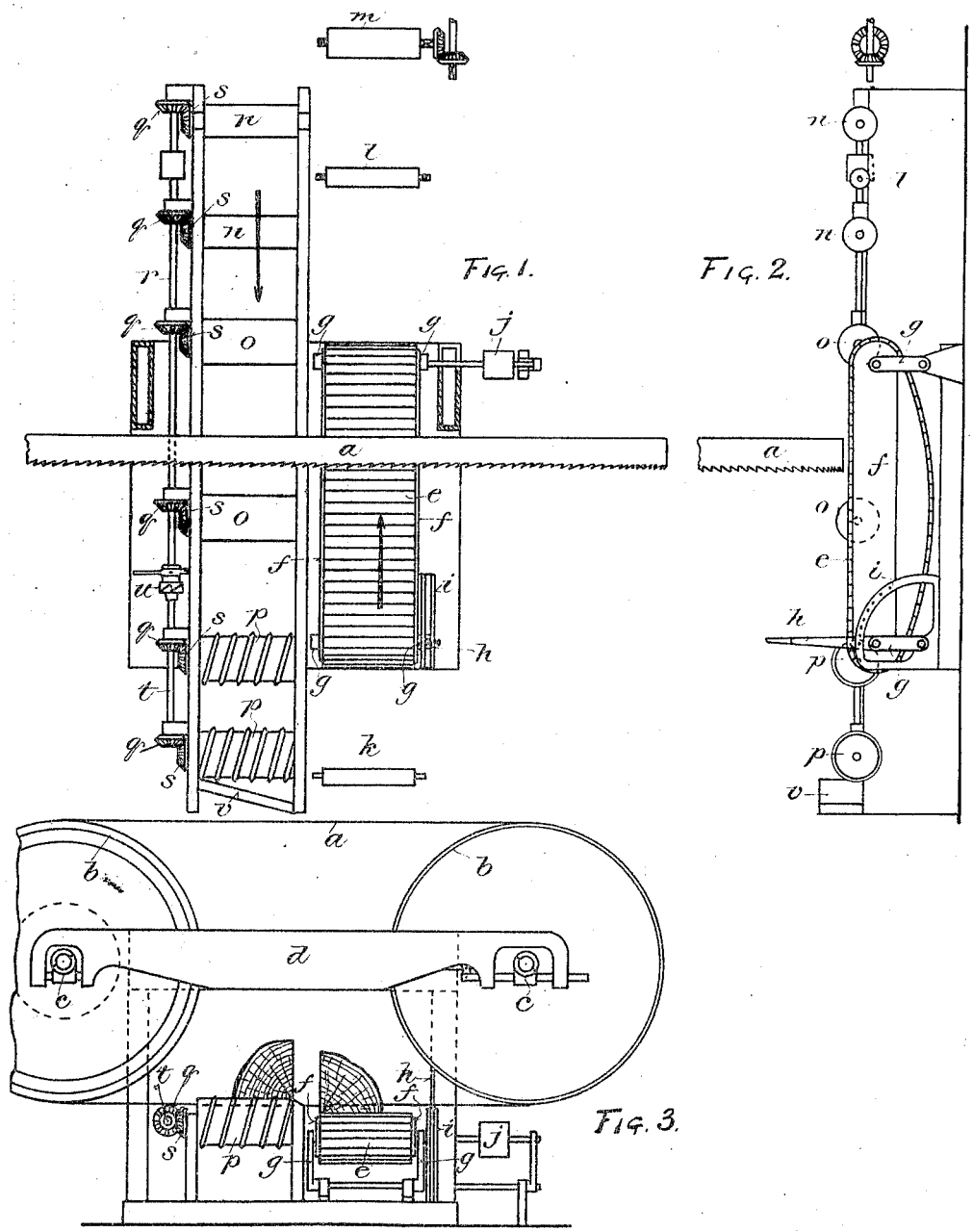

JOHN WALTON, OF MILWAUKEE, WISCONSIN.

RESAWING BAND-MILL.

No. 811,009.

Specification of Letters Patent.

Patented Jan. 30, 1906.

Application filed September 22, 1904. Serial No. 225,433.

*To all whom it may concern:*

Be it known that I, JOHN WALTON, a citizen of the United States, residing at Milwaukee, in the county of Milwaukee and State of Wisconsin, have invented certain new and useful Improvements in Resawing Band-Mills, of which the following is a specification, reference being had to the accompanying drawings, forming a part thereof.

This invention relates more particularly to single-cutting horizontal band-resaws. Its object is to increase the capacity and to simplify and improve the construction and operation of this class of mills.

It consists in certain novel features of construction and in the peculiar arrangement and combinations of parts hereinafter particularly described, and pointed out in the claims.

In the accompanying drawings like characters designate the same parts in the several figures.

Figure 1 is a plan view of essential parts of a resawing band-mill embodying the invention, certain parts being omitted, broken away, or shown in section. Fig. 2 is a side elevation of the same as viewed from the right with reference to Fig. 1, and Fig. 3 is a front end elevation of the machine.

$a$ designates a band-saw having teeth on one edge only. It is mounted upon band-wheels $b\ b$, of the usual or any suitable construction, which are arranged to carry the lower side or working span of the saw horizontally. The shafts of the band-wheel are provided with suitable bearings $c\ c$ in a frame $d$, and the usual or any suitable provision is made for stretching the saw and maintaining the proper tension on the working side or span thereof. Power to operate the saw is applied thereto through a pulley on one of the band-wheel shafts, as indicated by dotted lines on Fig. 3, or through any convenient and suitable driving connection. The timber or material to be sawed is fed to the working side of the saw, preferably the lower span, by any suitable means. An endless flexible table or conveyer $e$, carried transversely to and below the lower span of the saw on drums or rollers at the ends of a vertically-movable frame $f$, is shown for this purpose.

The frame $f$ is supported at the ends by links $g$, which may be set at different angles to a perpendicular by means of the lever $h$ and quadrant $i$ to adjust the table or conveyer $e$ to different vertical positions for sawing boards or lumber of different thicknesses.

The shaft of the drum or rollers at one end of the table or conveyer is shown in Fig. 1 as provided with a pulley $j$ for driving said table or conveyer in the direction indicated by the arrow thereon. A series of rollers $k$ and a similar series of rollers $l$ are arranged at the front and rear ends of the table or conveyer $e$ to support the lumber or material as it is delivered to and from the same. A series of live rollers $m$, driven by any suitable means, is also provided beyond the rollers $l$ to receive and conduct away the boards as they are sawed from the under side of the pieces of timber by the saw $a$ and delivered by the conveyer $e$ upon the rolls $l$.

Alongside of the conveyer $e$ and the receiving and delivering rollers $k$ and $l$ a series of rollers $n$, $o$, and $p$ are arranged to receive the timber or material to be resawed from the rollers $l$ and return it over the working span of the saw to the rollers $k$ and the receiving end of said conveyer. The upper sides of the rollers $n$ are set approximately in the plane or at the level of the working span or lower side of the saw $a$, while the rollers $o$, which are arranged on both sides of the saw, and the rollers $p$ project slightly above the same. The rollers $n$ and $o$ are turned simultaneously in the proper direction by bevel-gears $q$, mounted on a longitudinal feed-shaft $r$ and meshing with similar gears $s$ on the roller-shafts, and the rollers $p$ are driven by means of like or similar gears on a shaft $t$, which is connected end to end with the shaft $r$ by a clutch $u$.

The rollers $p$ are formed or provided on their peripheries with screws or spirals which are adapted to move the lumber or material thereon sidewise toward the rollers $k$ and the conveyer $e$. In front of the screw-rollers $p$ a slanting or oblique stop $v$ is arranged to arrest the endwise movement of the returning timber or material and direct it as it is moved sidewise by said rollers to and upon the rollers $k$ and conveyer $e$.

The mill hereinbefore described operates as follows: A piece of timber to be sawed is placed on the receiving-rollers $k$ and the front end of the traveling table or conveyer $e$, by which it is fed endwise to and against the saw and delivered, with the board cut from the under side thereof, to and upon the rollers *l*. After it has cleared the saw the piece to be resawed is turned over by hand or by other means (not shown) upon the rollers *n*, while the board passes upon and is conducted off by the live rollers *m*. The piece to be resawed is moved endwise by the live return-rollers *n* upon the rollers *o*, which lift it above and carry it over the lower side or span of the saw and deliver it against the slanting stop *v* upon the screw-rollers *p*, which, if they are in operation, move it sidewise to and upon the rollers *k* and conveyer *e* in position to be again fed to the saw in the manner above explained. In case another piece is being sawed at the time the piece returned may be held on the screw-rollers *p* until the conveyer *e* is ready to receive it by disengaging the clutch *u*.

Various changes in details of construction and arrangement of parts may be made without departing from the principle and intended scope of the invention.

I claim—

1. In a resawing band-mill the combination with the band-wheels and the saw having its working span between said wheels horizontally disposed, a vertically-adjustable feeding-conveyer arranged and movable transversely to the saw and a returning-conveyer arranged alongside of the feeding-conveyer with its receiving end approximately at the level of the delivery end of the feeding-conveyer and its delivery end above the receiving end of said feeding-conveyer and adapted to elevate and return the material to be resawed over the working span of the saw, substantially as described.

2. In a resawing band-mill the combination with the saw and its carrying-wheels, of means for feeding the material to the lower span of the saw, means arranged alongside of the feeding means for returning the material to be resawed between said wheels and between and out of contact with the spans of the saw, substantially as described.

3. In a resawing band-mill the combination with the band-wheels and the saw mounted thereon with its spans horizontally disposed, of means adapted to feed the material to be sawed to the lower span of the saw and means arranged alongside of said feeding means and adapted to return the material to be resawed over and out of contact with the lower span of the saw and between the band-wheels, substantially as described.

4. In a resawing band-mill the combination with a horizontally-disposed band-saw, its carrying-wheels and a feeding-conveyer arranged and movable transversely to the saw, of means for returning the material to be resawed over the working span of the saw between the band-wheels and for delivering it sidewise to the receiving end of said conveyer, substantially as described.

5. In a resawing band-mill the combination with the band-wheels and the band-saw having its spans between said wheels arranged horizontally, of a vertically-adjustable feeding-conveyer arranged below and transversely to the lower span of the saw, and a series of rollers arranged alongside of said conveyer and adapted to return the material to be resawed over the lower span of the saw to the receiving end of said conveyer, the upper sides of the rollers adjacent to the saw projecting above the plane of its lower span, substantially as described.

6. In a resawing band-mill the combination with a horizontally-disposed band-saw and its supporting and driving wheels, of a series of rollers for returning the material to be resawed over the working span of the saw to the feeding-point, the rollers at the rear end of the series having their upper sides approximately on a level with the working span of the saw, the rollers on each side of the saw projecting above said level and the rollers at the front end of the series having screws or spirals adapted to move the returning material sidewise into position to be fed to the saw, substantially as described.

7. In a resawing band-mill the combination with the saw and its carrying-wheels arranged to support the working span of the saw in a horizontal position, of a feeding-conveyer arranged transversely to the saw, a series of rollers arranged alongside of said conveyer to return the material to be resawed over the working span of the saw to the starting-point, the rollers at the front end of the series having screws or spirals adapted to move the material sidewise to the receiving end of said conveyer, and a slanting stop in front of the screw-rollers, substantially as described.

8. In a resawing band-mill the combination with the saw and its carrying-wheels arranged to support the working span of the saw horizontally, of means for feeding material to the saw, a series of rollers for returning the material to be resawed to the starting-point, the front rollers of the series having screws or spirals for moving the returning material sidewise to the feeding means, means for turning said rollers and means for connecting and disconnecting the screw-rollers with the driving means at will, substantially as described.

In witness whereof I hereto affix my signature in presence of two witnesses.

JOHN WALTON.

Witnesses:
  CHAS. L. GOSS,
  ANNIE SEIDEL.